June 12, 1962 J. JEFFORDS 3,038,653

APPARATUS FOR RECORDING RACE TRACK BETS

Filed Nov. 29, 1960 5 Sheets-Sheet 1

INVENTOR

JOSEPH JEFFORDS,

BY J. Wesley Everett

ATTORNEY

APPARATUS FOR RECORDING RACE TRACK BETS

INVENTOR
JOSEPH JEFFORDS,
BY
ATTORNEYS

June 12, 1962 J. JEFFORDS 3,038,653

APPARATUS FOR RECORDING RACE TRACK BETS

Filed Nov. 29, 1960 5 Sheets-Sheet 3

INVENTOR
JOSEPH JEFFORDS,

BY Jweasley Everett
ATTORNEY

INVENTOR
JOSEPH JEFFORDS,

BY [signature]
ATTORNEY

INVENTOR
JOSEPH JEFFORDS

BY [signature]

ATTORNEY

United States Patent Office 3,038,653
Patented June 12, 1962

3,038,653

APPARATUS FOR RECORDING RACE TRACK BETS

Joseph Jeffords, deceased, late of Baltimore, Md., by Douglas N. Sharretts, executor, 1427 Munsey Bldg., Baltimore 2, Md.

Filed Nov. 29, 1960, Ser. No. 72,526
1 Claim. (Cl. 234—53)

The invention relates to a method and apparatus for recording and transmitting information and, more particularly, to a method and apparatus for recording and transmitting bets at a racetrack from remote betting stations to central recording stations.

The present application is a continuation-in-part of application Serial Number 199,680, filed December 7, 1950, which issued as Patent No. 2,647,974, dated August 4, 1953, application Serial Number 528,085, filed August 12, 1955, now abandoned, and application Serial Number 675,935, filed August 2, 1957, now abandoned.

The method and apparatus of the present invention is particularly adaptable to parimutuel betting at race tracks, and so will be specifically described in conjunction therewith. It is a matter of public knowledge that many states have legalized parimutuel betting at race tracks under state supervision, to direct betting on horse races, dog races, etc., to a controllable channel relatively free from the abuses to which betting under other arrangements was subject. Legalized parimutuel betting has the advantage of allowing those who desire to bet on sporting events to vent their urge in a legal and controlled manner, with the added benefit of providing needed income for state and local governments. This invention, as applied to race track betting, improves the operation of parimutuel betting now used, and is installed only with legalized parimutuel betting systems.

In present day parimutuel betting it is necessary for the would-be bettor to leave his seat or station and go to a parimutuel window every time he wishes to bet. This entails descending stairs or forcing his way through a crowd. He must then wait in line to purchase tickets on the horse of his choice and then make his way back to his seat. If he desires to bet on every race, he has to go through this time-consuming and annoying procedure at least eight times during a racing card. The result is that many people are impeded from betting resulting in lost income for the governmental authority and for the track. This invention makes it possible for a bettor to bet on every race without leaving his seat or station, thus enhancing his enjoyment of racing by avoidance of the inconvenience hitherto attendant upon betting, and also increasing the income of the governmental authority and the track.

The apparatus of the present invention includes a plurality of remote betting stations that may be located at advantageous positions around the track, such as on the seats in the grandstand, a plurality of central recording or receiving stations preferably located adjacent one another at a central location, and a conveyor for transmitting records made at the central recording stations to a location where such records may conveniently be collated, tabulated, etc. Each remote betting station comprises a recording unit within which a card may be placed for recording, a plurality of control members for recording bet information on the card, and electrical switches controlled by the control members operable to transmit the recorded information through wires to the corresponding central station. Each central station comprises a recording unit within which a record card may be placed and a plurality of electrically-operated recording members controlled by operation of the corresponding control members of the remote betting station. Switches and indicators for auxiliary communication between bettor and central station operator are also provided.

The method and apparatus of the present invention will now be more fully described in conjunction with the accompanying drawings showing a preferred embodiment of the invention.

Figure 1:
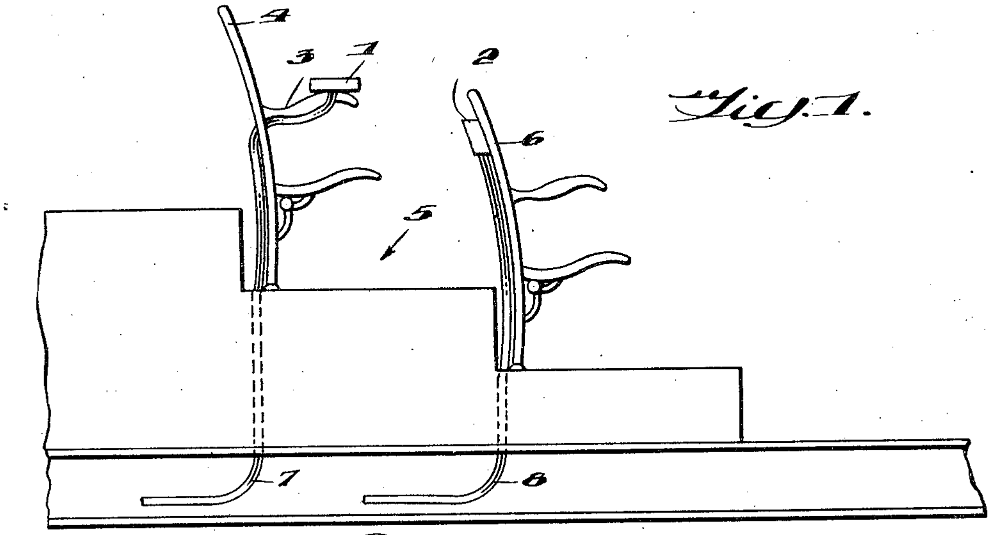
FIG. 1 is a side elevational view of a portion of the grandstand at a race track, showing remote betting stations of the invention.

Referring to the drawings, a pair of remote betting stations or selector stations 1 and 2, is shown in FIG. 1. Station 1 is mounted on the arm-rest 3 of a seat 4 in the grandstand 5 of a race track while station 2 is mounted on the back of seat 6. The station units may of course be mounted at any convenient position at the track, and as many units as desirable may be employed. Cables 7 and 8 are connected between stations 1 and 2 and the central receiving stations, now to be described.

Figure 2:
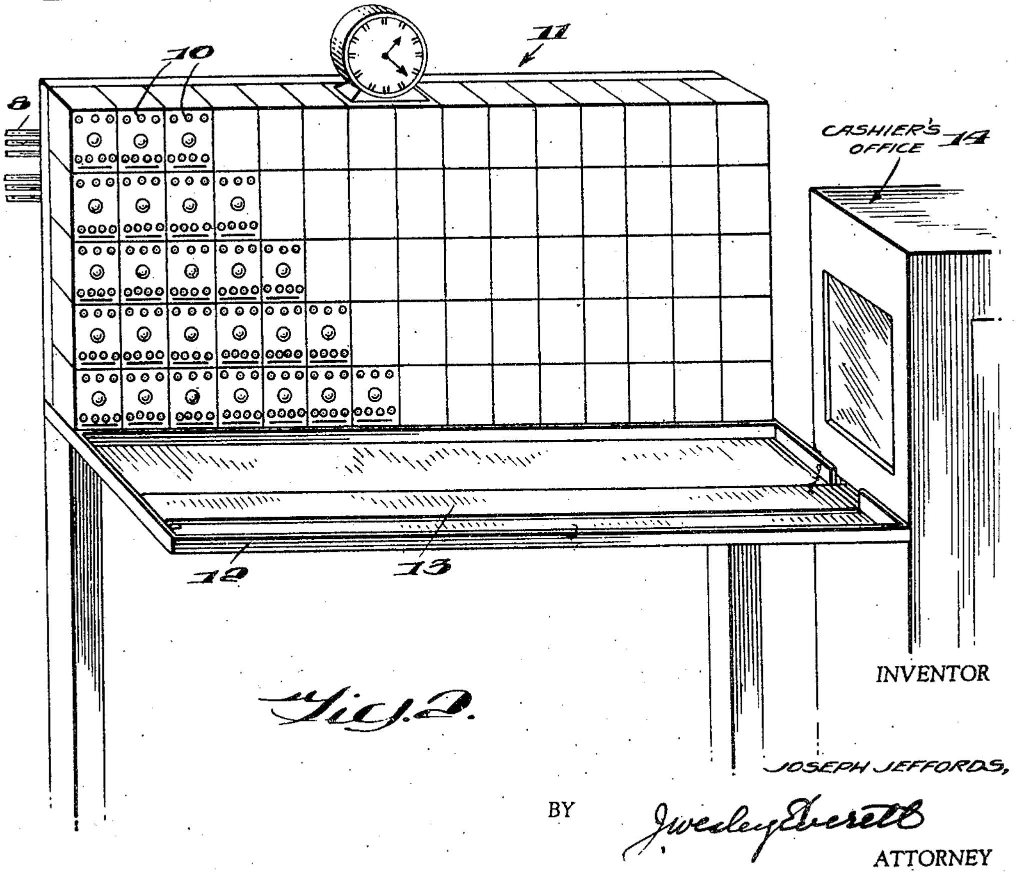
FIG. 2 is a perspective view of a plurality of central stations at the central location, and the cooperating conveyor for the record cards.

In FIG. 2 are shown a plurality of central stations or receiving station units 10 mounted in a panelboard type arrangement 11. One central station is provided for each remote station, and cables connect the associated remote and central stations to each other.

A table 12 is provided at the panel board central location, and a belt-conveyor 13, actuated by any convenient means (not shown) is movable in the table and carries record cards from the various central stations to a tabulating machine or to the Cashier's Office 14, where they are sorted, collated, tabulated, etc.

Figures 3, 4:
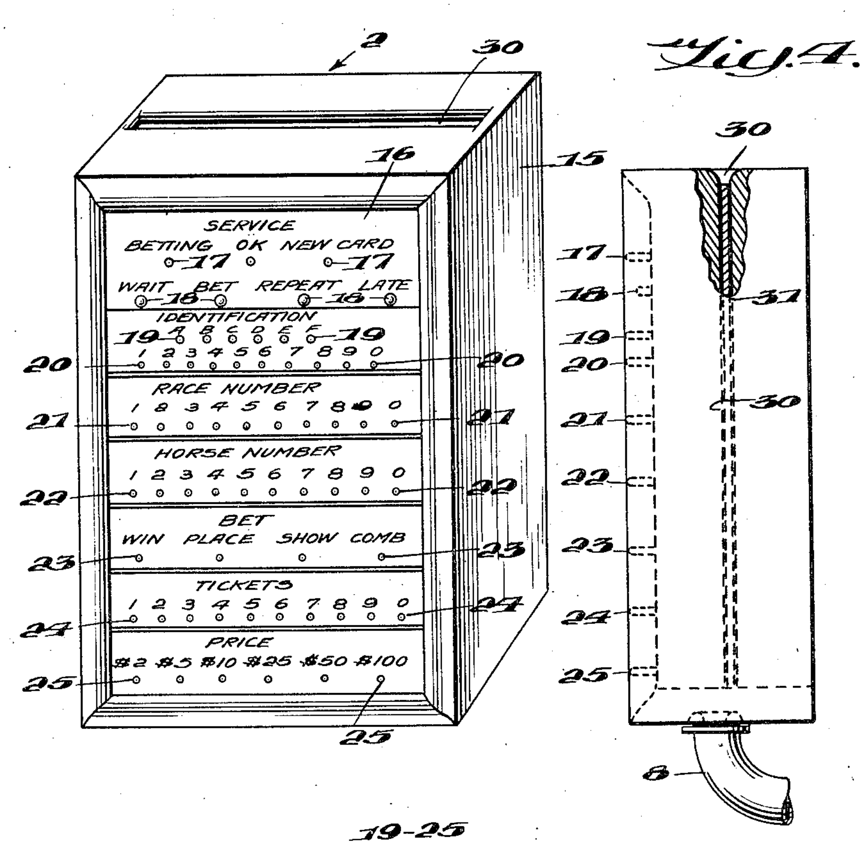
FIG. 3 is a perspective view of one of the remote betting stations of the invention.
FIG. 4 is a side elevational view of the apparatus of FIG. 3, with parts broken away and shown in section.
Figure 5:
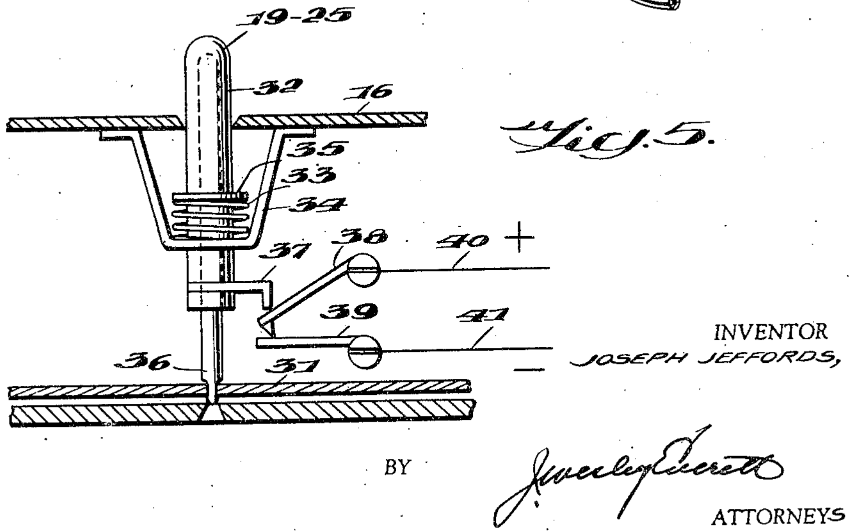
FIG. 5 is a detail view of one of the control members of the remote betting station, showing the associated perforating element and switch member.
Figures 6, 7:
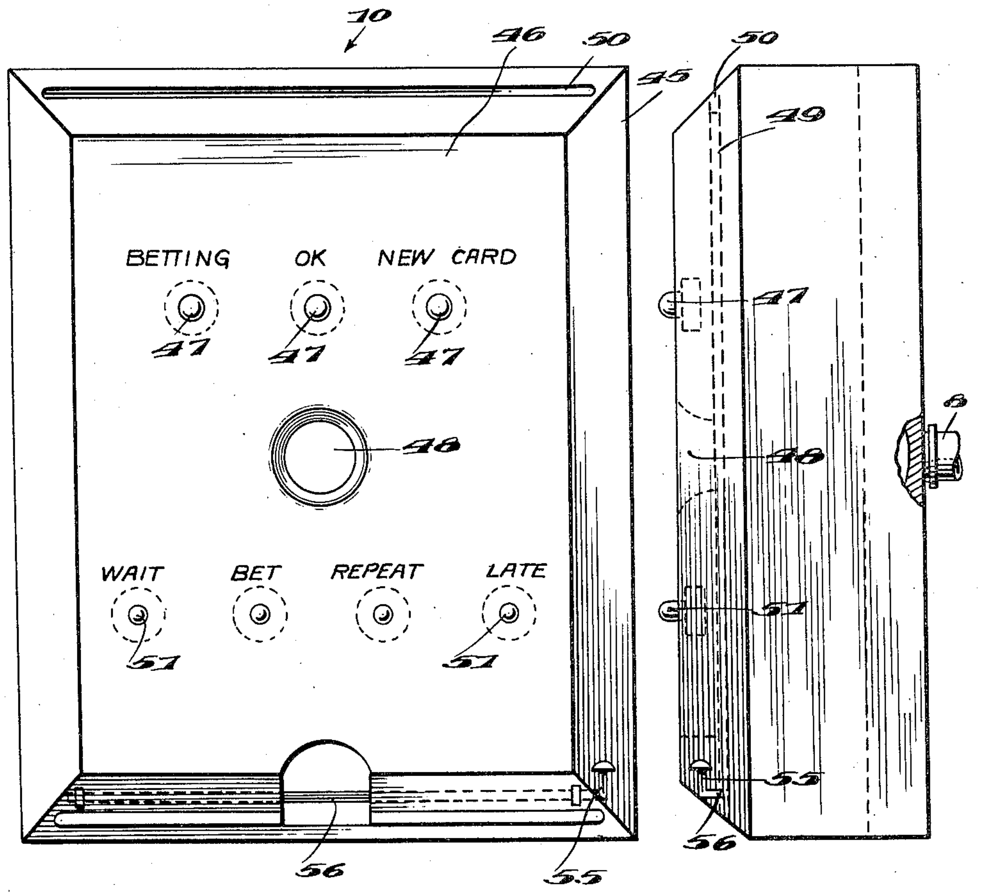
FIG. 6 is a front elevational view of one of the central receiving stations of the invention.
FIG. 7 is a side elevational view of the apparatus of FIG. 6.

Referring now to FIGS. 3 through 5, the construction of the remote betting stations will be more specifically described. Betting station 2 comprises a box 15 having a front panel 16 carrying various control elements, such as lamp indicators and identifying indicia necessary for the betting, recording and bet transmitting functions of the station.

The panel 16 may conveniently be divided into seven sections, as shown, for the various indicating and controlling functions. The topmost section, labelled "Service" contains a plurality of push-button switches 17, labelled "Betting," "O.K.," and "New Card." As will be explained later with reference to the schematic drawing, actuation of these switches causes operation of corresponding indicators on the associated central station to permit communication between the bettor and the central station attendant or operator.

The same section of panel 16 contains four lamp indicators 18 labelled "Wait," "Bet," "Repeat" and "Late." As will also be explained later, these lamp indicators are operated through actuation of corresponding switches on the central station unit.

The next section of the panel 16, labelled "Identification" contains a plurality of push-button type control elements 19 for letters A through F and a plurality of like control elements 20 for numbers 1 through 0. These elements are provided to permit the local record card to be marked with a letter and numeral identifying the bettor, and to transmit the identification marked on the card simultaneously to the corresponding central station.

In order to permit the local card at the remote station to be marked in accordance with the bet to be made, and to permit the recorded information to be transmitted subsequently to the corresponding central station, panel 16 is provided wtih a section title "Race Number " provided with push-button control elements 21 labelled 1 to 0, a section labelled "Horse Number," provided with control elements 22 marked 1 to 0, and a section titled "Bet" provided with push-button control elements 23 labelled "Win," "Place," "Show," and "Comb." Also a section titled "Tickets" having control elements 24 labelled 1 to 0, and a section labelled "Price," having control elements 25 labelled with price figures, are provided.

As is shown in FIGS. 3 and 4, box 15 is provided with an internal slot 30 to receive a card 31 forming the permanent record element for the remote betting station 2.

Referring now to FIG. 5, each of push-button control elements 19—25 includes a plunger member 32 projecting inwardly of panel 16. A spring 33, operating between a bracket 34 fixed to the panel and a plate 35 fixed on the plunger, urges the plunger outwardly. Plunger member 32 carries an indicia-applying element in the form of a perforator or punch 36. The perforator is adapted to cut a slot or perforation in an appropriate portion of card 31 to form a permanent record of which push-button control element was actuated and, therefore, what item of information was desired to be recorded.

In order to permit transmission of the recorded information to the central location without utilization of complex arrangements, plunger member 32 also carries a presser member 37 which operates a movable switch member 38 to press it into contact with the stationary switch member 39 when the plunger member is moved inwardly to the position shown. The punch 36 is of such length and the card in such relative position thereto that the punch extends through the card 31 before the switch element 38 is pressed into contact with the stationary element 39. Wires 40 and 41 are connected to switch members 38 and 39, respectively, and carry the information recorded, in the form of a circuit closure, to the central station.

Now turning to FIGS. 6 through 10, the specific construction of a central station will be described. The central station 10 comprises a box 45 having a front panel 46. The front panel carries three lamp indicators 47, marked "Betting," "OK," and "New Card" and cooperating with the corresponding switches on the associated remote betting station to allow the bettor to communicate with the central location attendant. The station also has a slot 48 of circular form through the front panel to permit inspection of the recording card 49 in the slot 50 of the station.

In addition, the central station unit is provided with a set of push-button switches 51, labelled "Wait," "Bet," "Repeat," and "Late," and designed to cooperate with the corresponding lamp indicators 18 on the associated remote betting station to allow communication with the bettor. Further, a control lever 55, manually operable to control the position of a slot blocking member 56, allows the central locations attendant to open slot 50 to allow card 49 to be removed for checking and placement onto conveyor belt 12. It will be obvious that movement of the slot blocking member could be automatic and that the conveyor could be positioned to receive the cards by free fall from the stations, if desired.

Figures 8, 9:
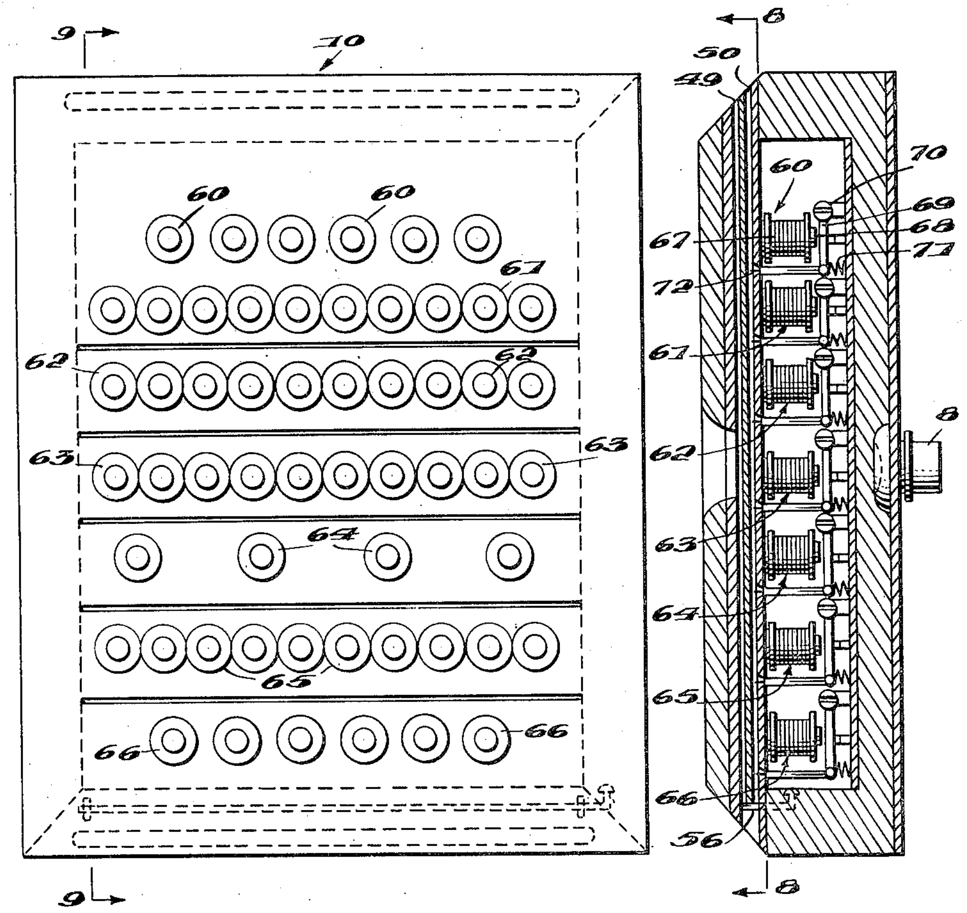
FIG. 8 is a sectional view of a central station taken on line 8—8 of FIG. 9.
FIG. 9 is a sectional view of the apparatus of FIG. 8 taken on line 9—9 thereof.
Figure 10:
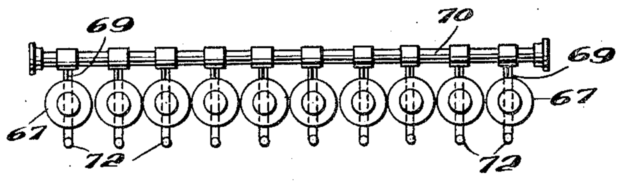
FIG. 10 is a detail view of one bank of the perforating members of the central station.

Referring to FIGS. 8 through 10, the electrically operated perforators of the central station unit 10 are shown as including a row of electrically operated magnetic annunciator-like recording members 60, corresponding to control elements 19 on the remote betting unit, and similar rows of recording members 61—66, corresponding to control elements 20—25 respectively. Each recording member 60 carries a coil 67 and a magnetic core 68. Actuation of any of members 60—66 by energization of coil 67 causes attraction of an armature 69 to the core member. Armature 69 is pivoted at one end to a shaft 70 journalled in the central station unit and spring-urged by spring 71 at its other end away from core 68. Armature 69 also carries a perforator 72 which projects into slot 50 to perforate record card 49 when the armature is attracted to the core.

Figure 11:
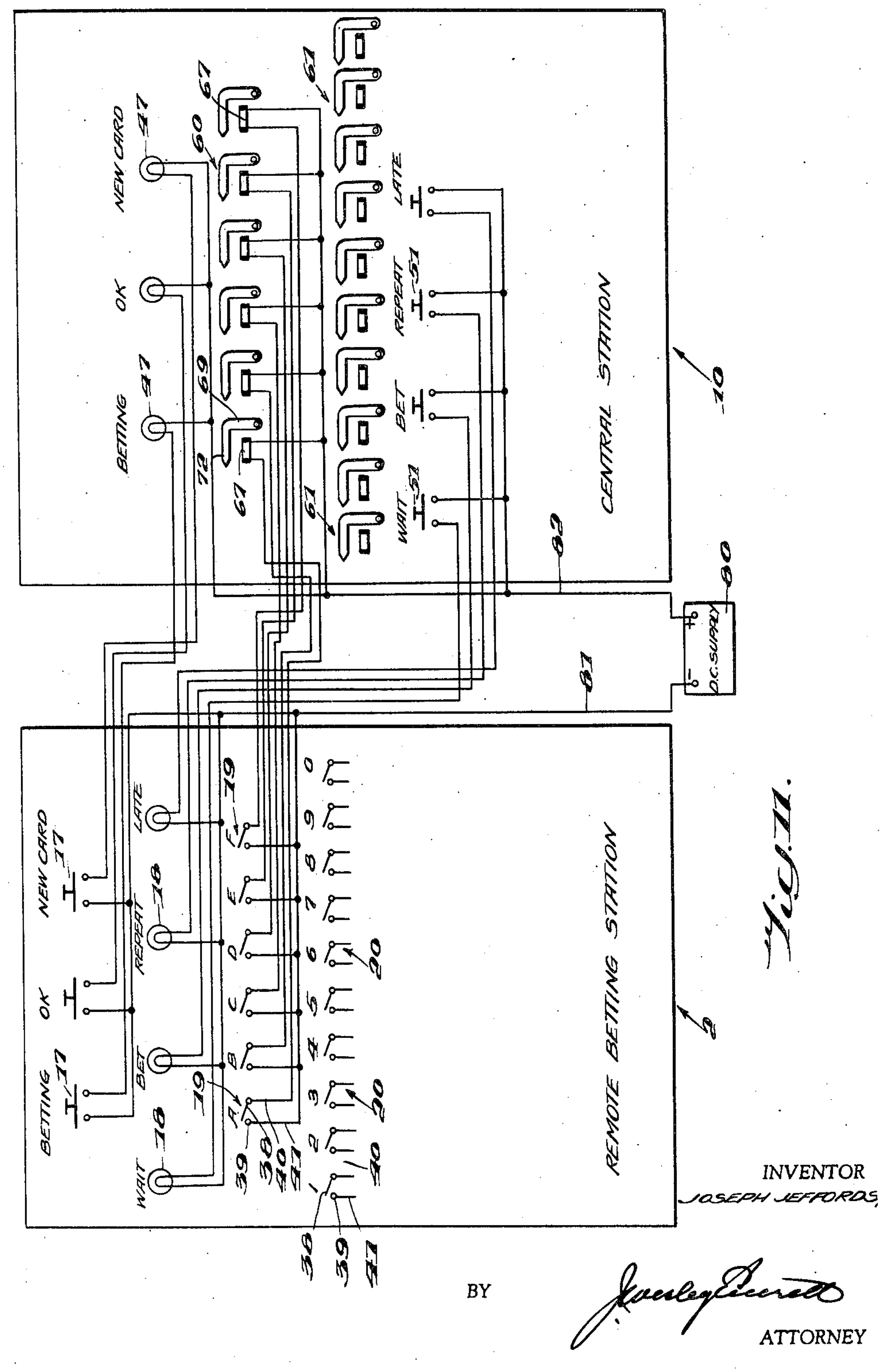
FIG. 11 is a schematic view of the electrical apparatus of the invention.

The electrical elements and connections of the apparatus will be more clearly understood in conjunction with a schematic diagram thereof as shown in FIG. 11. In that figure, a supply of D.-C. voltage 80, of appropriate value, is shown. The negative terminal of that supply is connected by negative lead 81 to one side of each of push-button switches 17 and control elements 19—25, as well as to one side of each of lamp indicators 18, in remote betting station 2. The positive terminal of the D.-C. supply is connected by positive lead 82 to one side of each of lamp indicators 47, to one side of each of push-button switches 51 and to one side of the operating coil 67 of each of recording members 60—66, of central station unit 10. Control elements 20 of remote betting station 2 and recording members 61 of central station 10 are shown unconnected, and control elements 21—25 and corresponding recording members 62—66 are not shown, since the connections of these elements correspond to the connections of control elements 19 and recording members 60.

The other side of each of push-button switches 17 is connected to the other side of the corresponding one of lamp indicators 47, while the other side of each of lamp indicators 18 is connected to the other side of the corresponding one of push-button switches 51 and the other side of each of control elements 19—25 is connected to the other side of the corresponding one of recording members 60—66.

The above described connections permit communication between the remote betting stations and the corresponding central receiving stations, and also provide for transmission of a bet made at the betting station to the central receiving station and perforation of a record card at the central station after the card at the betting station has been punched.

If desired, the central station units may be provided with visual indicators operable to indicate to the central station attendant which of the central station recording members is being operated. Such indicators may conveniently be electric lamps shunted across the coils of each of the recording members and exposed through the panel of the central station unit.

In operation of the apparatus of the invention, when a patron of the race track decides he wishes to bet, he deposits with a cashier an amount of money sufficient to cover the bets he thinks he will make during the day. The cashier then prepares a record of the deposit in any suitable manner and provides the bettor with an identification number, e.g., A 45. The bettor then takes his seat adjacent to remote betting station 2. If he decides to bet $5.00 to win on horse No. 3 in the first race, he places a record card 31, if not already in the machine, into slot 30 and punches "A" button of push-button control elements 19 and "4" and "5" buttons of control elements 20. These operations cause the perforators 36 carried by these button control elements to punch or perforate holes in columns of card 31 corresponding to this identification. After the punch has moved through the card the corresponding presser members 37 of the control elements actuated close movable contacts 38 on stationary contacts 39. This action closes three circuits between the coil of the "A" record member 60 and the coils of the "4" and "5" record members 61 of the central station and the D.-C. supply. Current passing through these coils causes the associated perforators 72 to penetrate record card 49 in central receiving station 10 in columns and rows appropriate to record identification number A 45 on the card. The bettor then presses "1" button of elements 21, "3" button of elements 22, "Win" button of elements 23, "1" button of elements 24, and "5" button of elements 25. These operations cause the corresponding perforators 36 to punch holes in the corresponding rows and columns of record card 31 to form a permanent record. After which, these operations cause closure of the corresponding switch contacts 38 on associated switch contacts 39 to close circuits to the coil of "1" record member 62, the coil of "Win" record member 64, the coil of "1" record member 65, and the coil of "$5" record member 66, all to the D.-C. supply 80. Closure of these circuits causes attraction of the corresponding armatures 69 and movement of the corresponding perforators 72 to punch holes in the record card 49 to form a second permanent record of the bet information. The cards may be fed into both the remote and central punching devices automatically.

After the record card 49 has been completed, the bettor depresses push-button "OK" of switches 17 and the central station attendant may remove the card from the central station, for instance by actuating lever 55, examine it to determine whether the record was properly made, and compare it with the cashier's record of the bettor's deposit to determine whether the bettor has sufficient funds on deposit to make the bet. If everything is in order he may drop the card into a specific collecting or conveyor belt 13, which carries the card to Cashier's Office 14. The attendant may then turn his attention to the other central receiving stations under his supervision and perform similar functions there.

If for any reason the card 49 was not properly marked, the attendant may communicate with the bettor through actuation of one of switches 51. For instance, if the starting gate was closed for the first race before the bet was complete, switch "Late" of switches 51 may be pressed, thus closing a circuit between D.-C. supply 80 and indicator "Late" of indicator lamps 18. This will notify the bettor of the trouble and card 49 may be invalidated.

If, for instance, card 49 was not properly perforated, the attendant may press button "Repeat" of switches 51, thus lighting indicator "Repeat" on remote unit 2. The bettor may then remove card 31, insert a new card, and notify the attendant by pressing button "New Card" of switches 17. The betting operation will then be repeated.

It is obvious that as many communication circuits between the betting stations and central stations may be provided as are necessary and that the switches and indicators of these circuits may be labelled in any manner desired.

At the Cashier's Office or card collecting point 14, the cards 49 are removed from the conveyor belt 13, sorted and racked. At the end of the racing day, or whenever the bettor wishes to cash in, he will return to the cashier with his cards 31. The cashier will compare these cards with his record cards and the record of deposit made by the bettor and pay the bettor the amount due him.

While the system has been shown and described with providing that both the bettor and the attendant at the central station manually place individual cards in the punching devices to be punched, the cards may be fed automatically into the punching unit either individually or in a strip and separated from the strip by the time they are ejected to the bettor or to the attendant at the central station, as the case may be.

This arrangement of apparatus and method of operation provides for convenient betting and an accurate recording operation. The inconvenience of window pari-mutuel betting and the errors associated with human operation thereof are eliminated.

It will be obvious that many changes could be made in the embodiment of the invention described specifically herein. For instance, the various switching operations could be performed electronically and the record cards could be prepared in some other suitable manner. Particularly, the wiring arrangement and association of controls could be of any convenient type. Consequently, the invention is not to be considered limited to the specific embodiment and method of operation described but only by the appended claim.

What is claimed is:

An apparatus for recording and transmitting bets at race tracks from remote locations to a central collection point comprises, in combination a plurality of remote betting stations positioned at different distances remote from a central bet collecting station, each remote betting station being provided with a manually recording means and electrically controlled means for distance recording, the record means for the remote according station comprising, a card punching device having a card retaining means associated therein, the card retaining means having an opening adjacent one side of the punching device through which the card is adapted to be inserted into the punching device, the punching device comprising, a plurality of manually operated punches having parallel axis and predetermined location over the area to be occupied by the card of a particular pattern corresponding to a number bet, a race bet, and the amount bet, the card being supported by the card retaining means perpendicular to the axis of the punches, each of the manually operated punch elements having associated therewith an electric switch, means associated with the punching elements at the remote betting station for operating the respective switches to close an electrical circuit after the punch elements have passed through the card, a second card marking and punching device positioned at the central collecting station having card marking elements corresponding to each of the punching elements at the remote betting station including means for retaining a second named card in a position to be marked by the card marking device located at the central station, the card retaining means for the second named card having an opening adjacent one side therethrough for receiving the second named card into the second mentioned marking device, the second mentioned marking device having a continuous slot extending from the first mentioned opening to an opening on the opposite side of the said marking device through which the card is ejected, a removable blocking means extending across the second mentioned opening adapted to block the said opening when in one position and movable beyond the area of the opening when in another position, a plurality of marking elements carried by the second mentioned card marking device at the central station having substantially the same arrangement and relative position with respect to the second named card as do the manually operated punches have with the remote station cards, each marking element in the central collecting station having an operating means therefor comprising, an electric magnet for each marking element, a movable arm operable by each of the said magnets for operating a single marker, a separate electric circuit for operating each of the said magnets, each of the circuits extending between the switches of the corresponding punches of the remote stations and the magnets for operating the corresponding markers at the central collecting station after the punching of the card at the remote station, whereby the card at the central station is marked substantially in the same location as is the card punched at the remote betting station.

References Cited in the file of this patent

UNITED STATES PATENTS

| | | |
|---|---|---|
| 1,855,841 | Long et al. | Apr. 26, 1932 |
| 1,870,230 | Bolt et al. | Aug. 9, 1932 |
| 1,936,201 | Mansel | Nov. 21, 1933 |